3,658,892
DERIVATIVES OF N-PHENYLTHALAMIDE ACID USEFUL FOR REGULATING PLANT DEVELOPMENT
Henry Martin, Basel, and Jacques Rutener, Stein, Aargau, Switzerland, and Georg Pissiotas, Lorrach, Germany, assignors to Ciba-Geigy AG, Basel, Switzerland
No Drawing. Filed Dec. 11, 1968, Ser. No. 783,133
Claims priority, application Switzerland, Dec. 19, 1967, 17,795/67
Int. Cl. C07c 103/24
U.S. Cl. 260—518 A
9 Claims

ABSTRACT OF THE DISCLOSURE

N-arylphthalamide acids of the general formula

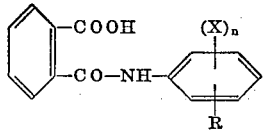

and/or their salts with inorganic or organic bases are used for influencing plant growth, plant development, formation and ripening of fruit.
R represents —$CF_3$, —$OCH_3$, —$SCH_3$ or —$SCF_3$, X stands for halogen, alkyl, alkoxy, —$NO_2$ or —$CF_3$ and $n$ is an integer from 0 to 3.

---

It has been found that N-arylphthalamide acids of the general formula

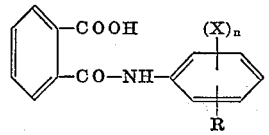
(I)

and/or salts thereof with inorganic and organic bases are useful for regulating plant growth and plant development and are active phytocides.

In the above Formula I R represents one of the groups —$CF_3$, —$OCH_3$, —$SCH_3$ or —$SCF_3$, X stands for halogen, alkyl or alkoxy, —$NO_2$, —$CF_3$ and $n$ is 0, 1, 2 or 3.

Among the compounds of Formula I there may be mentioned especially those encompassed by Formula II

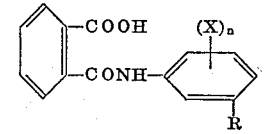
(II)

in which R has the meaning given above, X stands for fluorine, chlorine, bromine or iodine, $CH_3$, —$OCH_3$, $NO_2$ or $CF_3$ and $n$ is 0, 1 or 2. Amongst the group of the important compounds are those in which $n=0$.

The following active substances may be particularly mentioned as influencing plant growth, plant development, formation and ripening of the fruit. In tomato, cucurbita pepo, cucumber, melon, peanut and fruit-tree cultures they show particularly good results. Inhibition of plant growth is observed particularly in soya and cotton cultures:

(a) o-phthalic acid-3'-trifluoromethylanilide,
(b) o-phthalic acid-3'.5'-bis[trifluoromethyl]anilide,
(c) o-phthalic acid-2'-chloro-5'-trifluoromethylanilide,
(d) o-phthalic acid-3'-trifluoromethyl-4'-nitranilide,
(e) o-phthalic acid-2'.4'-dinitro-5'-trifluoromethylanilide,
(f) o-phthalic acid-3'-methoxyanilide,
(g) o-phthalic acid-4'-methoxy-3'-chloroanilide,
(h) o-phthalic acid-3'.4'.5'-trimethoxyanilide,
(i) o-phthalic acid-2'-nitro-5'-methoxyanilide,
(k) o-phthalic acid-2'.6'-dibromo-5'-methoxyanilide,
(l) o-phthalic acid-3'.5'-dichloro-4'-methoxyanilide,
(m) o-phthalic acid-2'-bromo-6'-methoxyanilide,
(n) o-phthalic acid-3'-methylmercaptoanilide,
(o) o-phthalic acid-2'-chloro-5'-methylmercaptoanilide,
(p) o-phthalic acid-3'-methylmercapto-4'-iodanilide,
(q) o-phthalic acid-3'-methoxy-4'-iodanilide,
(r) o-phthalic acid-3'-trifluoromethyl-4'-iodanilide,
(s) o-phthalic acid-3'-trifluoromethylmercaptoanilide,
(t) o-phthalic acid-2'-chloro-4'-methoxyanilide.

For the formation of salts inorganic or organic bases may be used.

As inorganic bases there are suitable, for example, alkali hydroxides such as NaOH, LiOH, $NH_4OH$, $Ca(OH)_2$.

As organic bases there are suitable, for example, simple aliphatic amines, such as methylamine, dimethylamine, diethylamine, piperidine, morpholine, ethanolamine, diethanolamine or triethanolamine.

For special purposes—particularly in order to make the active substances of Formula I more lipophilic—there are used for salt formation fatty amines, such as oleylamine, stearylamine and the like.

Typical preparation for regulating plant growth prevent unequal and premature ripening of the fruit, the putting forth of root-shoots of rice, the formation of parthenogenetic (seedless) fruit and change in the shape of the leaf.

Known regulating substances for plant growth that are used in order to initiate the setting of fruit, for example o-chlorophenoxypropionic acid and p-chlorophenoxyacetic acids, must only be applied to the blossom in order to avoid injuring the plant. This entails expensive application by hand.

In contrast the compounds of the invention may be sprayed on to the whole plant in a concentration which brings about the setting of fruit without causing any damage.

In a higher concentration the compounds of the invention are phytocidal and may be used to combat undesirable plants or induce dwarf growth.

The compounds of the invention may be applied in various ways, for example in the form of powders, aqueous dispersions, aqueous emulsions, granules and so on.

The N-arylphthalamide acids may be applied to the plants in an inert medium, for example as a dust with a powdery carrier from the series of the mineral silicates, for example mica, talc, pyrophyllite or clay, or they may be sprayed in aqueous solution. The effect on the plants depends, when using various concentrations, on the character of the media, on dosage, on the season and on the age, genus and type of plant, but also on the climatic conditions or the weather. The following general rule for effect and concentration of the compounds of the invention may be set up: Effects regulating development are definitely seen in concentrations of 0.1 to 40 parts per 1,000,000 parts of the compound in aqueous suspension; phytocidal and weed-combating effects as well as growth promotion are apparent when higher concentrations of the active substance are used, whilst phytocidal and weed-combating effects only become absolutely definite when 0.5% of active substance is used. The compounds of the invention are preferably used in admixture with a small quantity of a surface-active dispersant that may be an anionic surfactant, a nonionic or a cationic surfactant. Such a surfactant helps the N-arylphthalamide acids disperse in water so that they can be sprayed. The N-arylphthalamide acids may also be admixed with powdery carriers, such as mineral silicates together with a small quantity of such a surface-active dispersant in such a way that a readily wettable powder is obtained that can be applied directly to the plants or shaken with water in order to rapidly make a suspension of the chemical compound and of the powdery carrier in water.

The anionic surfactants that can be used in the present compounds or preparations influencing plant growth and development correspond to the general Formula R—COOM or R—SO$_3$M, in which M represents an alkali metal, ammonium or a substituted ammonium or amine radical and R represents an organic radical that contains at least one group having more than 8 carbon atoms.

Examples of such anionic surfactants are:

(1) Soaps, for example sodium laurinate, ammonium stearate, diethanol ammoniumoleate.

(2) Alkaline sulphonates, for example dodecyl sodium sulphonate, cetyl potassium sulphonate.

(3) Alkyl sulphates, for example sodium dodecyl sulphate, sodium oleyl sulphate.

(4) Sulphonated ethers with long and short chains of aliphatic groups, for example $$C_{17}H_{33}-O-C_2H_4-SO_3-Na$$

(5) Sulfatized ethers with long and short chains of aliphatic groups, for example $$C_{17}H_{33}-O-C_2H_4-O-SO_3Na$$

(6) Sulphonated alkyl esters with long chains of fatty acids, for example

(7) Sulphonated glycol esters with long chains of fatty acids, for example

(8) Sulphonated alkyl-substituted amides of fatty acids with long chain

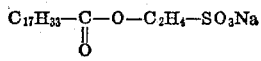

(9) Alkylated aryl sulphonates, for example isopropyl naphthaline sodium sulphonate, dodecylbenzene sulphonate.

(10) Hydroaromatic sulphonates, for example tetrahydronaphthaline sodium sulphonate.

(11) Alkylsulphosuccinates, for example dioctyl sodium sulphosuccinate.

(12) Arylsulphonate formaldehyde condensation products, for example the condensation product from formaldehyde and sodium naphthaline sulphonate:

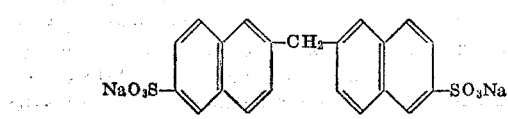

Non-ionic surface-active components that may be used for the preparations of the invention influencing plant growth are the following:

(1) Polyether alcohols, for example the reaction products of ethylene oxide or polyethyleneglycol with a fatty alcohol with a long chain, for example the reaction product of ethylene oxide and oleyl alcohol $$C_{17}H_{33}-(OC_2H_4)_n-OH$$

in which $n$ is a number from 10 to 20.

(2) Polyglycol esters, for example the reaction products of ethylene oxide or polyethyleneglycol with a fatty acid with a long chain, for example the reaction product of ethylene oxide or polyethyleneglycol with oleic acid

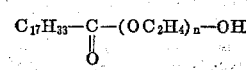

in which $n$ is a number from 10 to 20.

(3) Partial esters of polyvalent alcohols with fatty acids having a long chain, for example diethyleneglycol monolaurinate, sorbitant trioleate.

Cationic surface-active components that can be used as mixtures of the invention influencing plant growth are the following:

(1) Quaternary ammonium salts in which one of the groups bound to the nitrogen is an aliphatic group having at least 8 carbon atoms, for example trimethylcetyl ammonium iodide, laurylpyridinium chloride, cetyldimethylbenzyl ammonium chloride, N-stearyl betaine.

(2) Amines, amides, diamines and glyoxalidines that contain an aliphatic group having at least 8 carbon atoms and their acid esters, for example stearylamine hydrochloride, oleylamide, diethylethyleneoleyldiamine, ω-heptadecyl-N-oxyethylglyoxalidine.

The active substances of Formula I are prepared by reacting phthalic acid or phthalic acid anhydride with a corresponding aniline of the formula

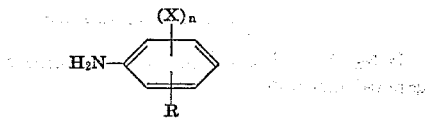

in molten form or in a solvent, and if phthalimides of the formula

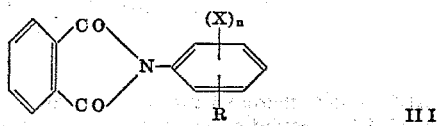
III are formed as intermediate products, the latter are hydrolysed subsequently with, for example, a base such as alkali hydroxide, and the compounds of Formula I precipitate by acidification. In the above formula R, X and $n$ have the meanings given above. (cf. for example A. Burger et al.; J. Org. Chem. 18, 192–195 (1953).

The invention also includes the new N-arylphthalamide acids of the formula

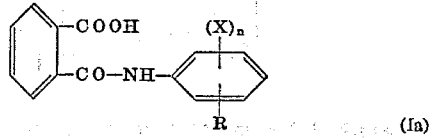
(Ia)

in which R represents one of the groups —CF$_3$, —OCH$_3$, —SCH$_3$ or —SCF$_3$, X stands for halogen, alkyl, alkoxy, —NO$_2$ or CF$_3$ and $n$ is 0, 1, 2 or 3, with the proviso that $n$ is at least 1 if a CF$_3$- or a CH$_3$O- group is in para-position or if a CH$_3$O-group is in ortho-position to the acid amide group, and salts of these N-arylphthalamide acids with inorganic or organic bases as mentioned hereinbefore.

Among the compounds of Formula Ia there may be mentioned those, in which R has the meaning given above, X represents one or more than one substituent from the group consisting of halogen, alkyl and alkoxy with at most 5 carbon atoms, $NO_2$ and $CF_3$ and $n$ is an integer from 0 to 3, with the proviso mentioned above.

Especially those compounds may be mentioned in which R has the meaning given above, X represents one or more than one substituent from the group consisting of halogen, alkyl and alkoxy with at most 2 carbon atoms, $NO_2$ and $CF_3$, and $n$ is an integer from 0 to 2, with the proviso mentioned above.

EXAMPLE 1

80.5 g. of m-trifluoromethylaniline are dissolved in 300 cc. of dioxan in a stirring flask. 74 g. of phthalic acid anhydride are added in small portions with stirring. The exothermic reaction sets in immediately. The reaction mixture is stirred overnight at room temperature and the precipitate then filtered with suction and dried, to yield 121 g. of N - 3-trifluoromethylphenylphthalamide acid melting at 183–185° C. (Active substance No. 1).

In an analogous manner the following phthalamide acids are prepared:

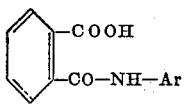

| Compound number: | Ar | Melting point, ° C. |
|---|---|---|
| 2 | -C6H4-Cl (with CF3) | 160–162 |
| 3 | -C6H3(CF3)2 | 185–186 |
| 4 | -C6H3(CF3)(O-CH3) | 193–193.5 |
| 5 | -C6H3(NO2)(CF3) | 186–187 |
| 6 | -C6H3(Cl)(CF3) | 189–190 |
| 7 | -C6H3(Cl)(CF3) | 167.5–168.5 |
| 8 | -C6H3(NO2)(CF3) | 67–68 |
| 9 | -C6H3(OCH3)(Cl) | 205–207 |
| 10 | -C6H3(Cl)(OCH3)(Cl) | 204–205 |
| 11 | -C6H3(NO2)(CF3) | 76–77 |
| 12 | -C6H4-OCH3 | 171 |
| 13 | -C6H4-SCF3 | 177–178 |
| 14 | -C6H4-SCH3 | 188–190 |
| 15 | -C6H4-SCH3 | 187–188 |
| 16 | -C6H4-OCH3 | 180–185 |
| 17 | -C6H4-OCH3 | 168–169 |

EXAMPLE 2

Dusting agents

Equal quantities of an active substance of the invention and precipitated silicic acid are finely ground. By adding kaolin or talc to the mixture a dusting agent can be prepared that contains preferably 1–6% of active ingredient.

Spraying powder

In order to prepare a spraying powder the following components, for example, are mixed and finely ground:

50 parts of active substance
20 parts of Hisil (highly adsorbent silicic acid)
25 parts of bolus alba (kaolin)
3.5 parts of the reaction product from p-tertiary octylphenol and ethylene oxide
1.5 parts of (1-benzyl-2-stearyl-benzimidazole-6,3'-sodium disulphonate).

Emulsion concentrate

Readily soluble active substances may also be used as emulsion concentrate according to the following prescription:

20 parts of active substance
70 parts of xylene
10 parts of a mixture from a reaction product of an alkylphenol with ethylene oxide and calcium dodecylbenzene sulphonate are mixed. On dilution with water to the desired concentration a sprayable emulsion is formed.

EXAMPLE 3

Tomato plants of the Montfavet type, 15–20 cm. high, were planted in a field at intervals of 1 m. on June 6. Aqueous spraying broths of various active substances of the invention and a known comparative substance were sprayed in concentrations of 75 and 150 p.p.m. on to 4 plants each on June 25, when the first umbel had developed. Further sprayings were carried out when more umbels appeared. Four applications were made altogether. The evaluation was carried out when the ripe fruit was harvested on August 22 and August 29 and showed the following average values:

| Compound No.: | Concentration (p.p.m.) | Number of tomatoes per plant | Weight per tomato, grams | Yield by weight in percent of the controls | Seed-formation |
|---|---|---|---|---|---|
| 1 | 75 | 22.0 | 120.5 | 112.1 | None or reduced. |
|   | 150 | 17.0 | 122.5 | 89.7 | None. |
| 2 | 75 | 16.8 | 118 | 81.5 | Reduced or none. |
|   | 150 | 16.2 | 127.5 | 89.2 | None. |
| 3 | 75 | 19.0 | 111.5 | 94.0 | Reduced. |
|   | 150 | 19.0 | 124 | 101.7 | Do. |
| Comparative [1] compound. | 75 | 21.8 | 108 | 101.3 | Normal. |
|   | 150 | 19.5 | 111 | 92.2 | Hardly reduced. |
|   | Control | 21.1 | 109.5 | 100 | Normal. |

[1] o-Phthalic acid-3'-methylanilide (known from German Patent specification 814,742).

As compared with the known compound and the untreated plants a strong influence on plants was observed with the compounds Nos. 1, 2 and 3. In each case premature ripening of the fruit occurred. In some cases an increase in yield was obtained or the formation of uniformly large fruits was promoted. Owing to parthenocarpic influence there was only slight or no seed-formation.

EXAMPLE 4

Inhibition of growth.—Aqueous solutions of the active substance prepared from emulsion concentrates were used in quantities of 5 kg./ha. of active ingredient to test growth-inhibiting properties in soya and cotton fields in pre-emergence and post-emergence procedures. When the crops were harvested the following results were obtained:

|  | Soya cultures | | | | | Cotton cultures | | | |
|---|---|---|---|---|---|---|---|---|---|
|  | Pre-emergence | | | Post-emergence | | Pre-emergence | | Post-emergence | |
| Compound No. | Kg./ha. | Inhibition | Remarks | Kg./ha. | Inhibition | Remarks | Kg./ha. | Inhibition of the new growth | Kg./ha. | Inhibition of the new growth |
| 1 | 5 | 5 | Stronger green colouring of the leaves. | 5 | 4 | Stronger green colouring of the leaves. | 5 | 1 | 5 | 3 |
| 12 | 5 | 3 | | 5 | 5 | do | 5 | 2 | 5,2.5 | 5,5 |
| Comparison [1] | 5 | 1 | | 5 | 1 | do | 5 | 1 | 5 | 2 |

[1] o-Phthalic acid-3'-methylanilide
Growth-inhibition:
  1=No inhibition.
  2=Slight inhibition.
  3=Moderate inhibition.
  4=Middling inhibition.
  5=Strong inhibition.

EXAMPLE 5

Cucurbita pepo plants are grown in a greenhouse and infested with spores of the test-fungus Erysiphe cichoriacearum DC. Two days after infestation the plants are sprayed with an aqueous broth from a dilution series of the active substance No. 8.

After 12 to 14 days the plants treated with at least 0.03% of active substance showed an infestation by fungi of 5% as compared with a 100% infestation of the untreated control plants of the same age.

What is claimed is:

1. N-arylphthalamide acids of the formula

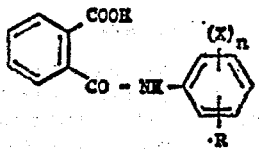

and their salts with alkali hydroxides or aliphatic amines, wherein R represents a member selected from the group consisting of —$CF_3$, —$OCH_3$, —$SCH_3$ and —$SCF_3$, X represents a member selected from the group consisting of halogen, alkyl and alkoxy with at most 5 carbon atoms, $NO_2$ and $CF_3$, and $n$ is an integer from 0 to 3, with the proviso that $n$ is at least 1 if a $CF_3$— or a $CH_3O$— group is in para-position or if a $CH_3O$— group is in ortho-position to the acid amide group.

2. N-arylphthalamide acids and their salts as claimed in claim 1, wherein R represents a member selected from the group consisting of —$CF_3$, —$OCH_3$, —$SCH_3$ and —$SCF_3$, X represents a member selected from the group consisting of halogen, alkyl and alkoxy with at most 2 carbon atoms, $NO_2$ and $CF_3$, and $n$ is an integer from 0 to 2, with the proviso that $n$ is at least 1 if a $CF_3$- or a $CH_3O$-group is in para-position or if a $CH_3O$-group is in ortho-position to the acid amide group.

3. N-arylphthalamide acids and their salts as claimed in claim 1, wherein R represents a member selected from the group consisting of —$CF_3$, —$OCH_3$, —$SCH_3$ and —$SCF_3$, X represents a member selected from the group consisting of chlorine, $CH_3$, $OCH_3$, $NO_2$ and $CF_3$, and $n$ is an integer from 0 to 2, with the proviso that $n$ is at least 1 if a $CF_3$- or a $CH_3O$-group is in para-position or if a $CH_3O$-group is in ortho-position to the acid amide group.

4. N-arylphthalamide acids and their salts as claimed in claim 1, wherein R is in the meta-position and represents a member selected from the group consisting of —$CF_3$, —$OCH_3$, —$SCH_3$ and —$SCF_3$, X represents a member selected from the group consisting of halogen, $CH_3$, $OCH_3$, $NO_2$ and $CF_3$, and $n$ is an integer from 0 to 3.

5. N-arylphthalamide acids and their salts as claimed in claim 1, wherein R represents a member selected from the group consisting of —$SCH_3$, —$SCF_3$, ortho-$CF_3$ meta-$CF_3$ and meta-$OCH_3$, and $n$ is zero.

6. N-arylphthalamide acids and their salts as claimed in claim 1 of the formula

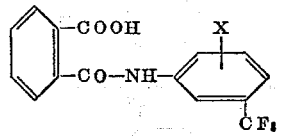

wherein X represents a member selected from the group consisting of hydrogen, chlorine and bromine.

7. The compound of the formula
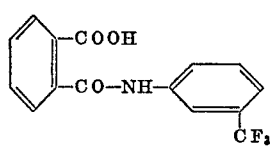
8. The compound of the formula
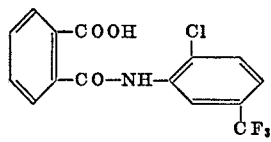
9. The compound of the formula
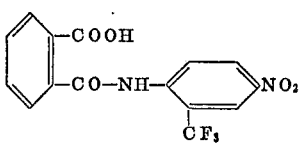
References Cited
UNITED STATES PATENTS
3,507,904   4/1970   Schwartz et al. _____ 260—518
LORRAINE A. WEINBERGER, Primary Examiner
L. A. THAXTON, Assistant Examiner
U.S. Cl. X.R.
71—88, 94, 98, 115; 260—247.2 R, 294 D, 501.11, 516, 519

Disclaimer 3,658,892.—*Henry Martin*, Basel, and *Jacques Rufener*, Stein, Aargau, Switzerland, and *Georg Pissiotas*, Lorrach, Germany. DERIVATIVES OF N-PHENYLTHALAMIDE ACID USEFUL FOR REGULATING PLANT DEVELOPMENT. Patent dated Apr. 25, 1972. Disclaimer filed Dec. 4, 1974, by the assignee, *Ciba-Geigy A.G.*

Hereby enters this disclaimer to claims 1 through 7, inclusive, of said patent.

[*Official Gazette June 10, 1975.*]